_United States Patent Office_

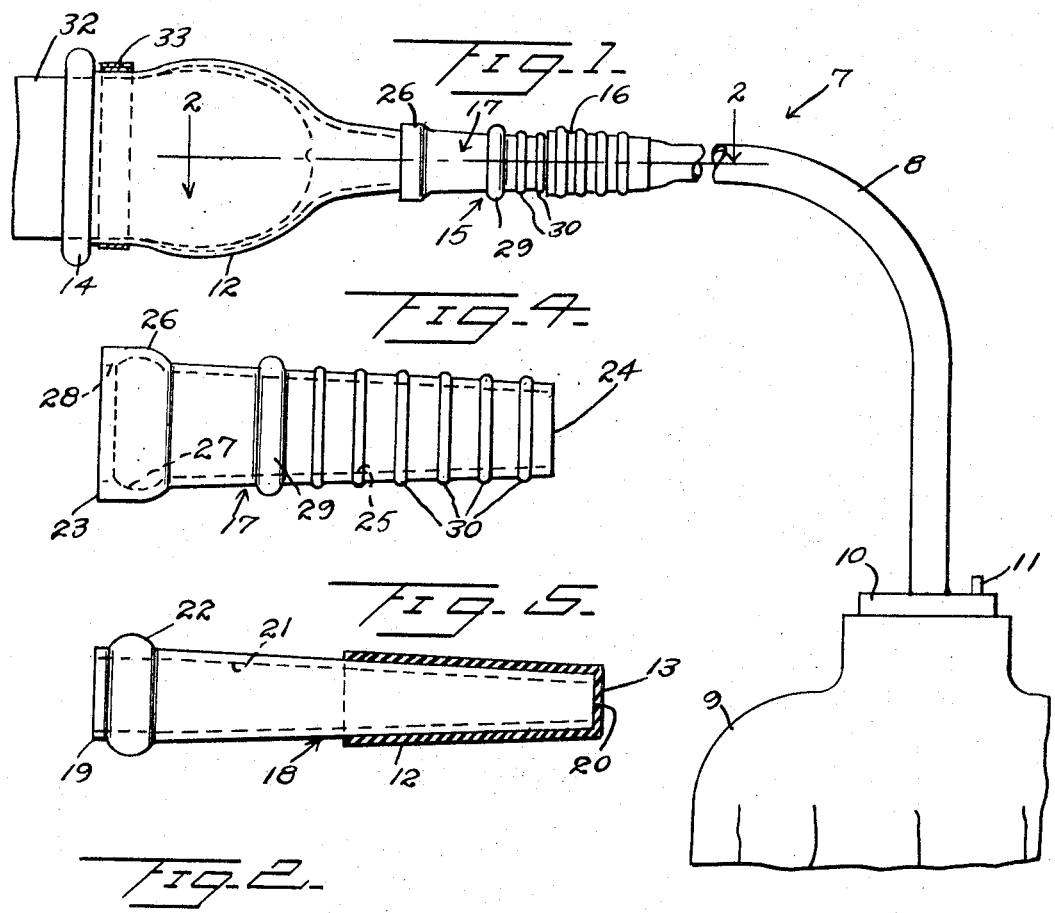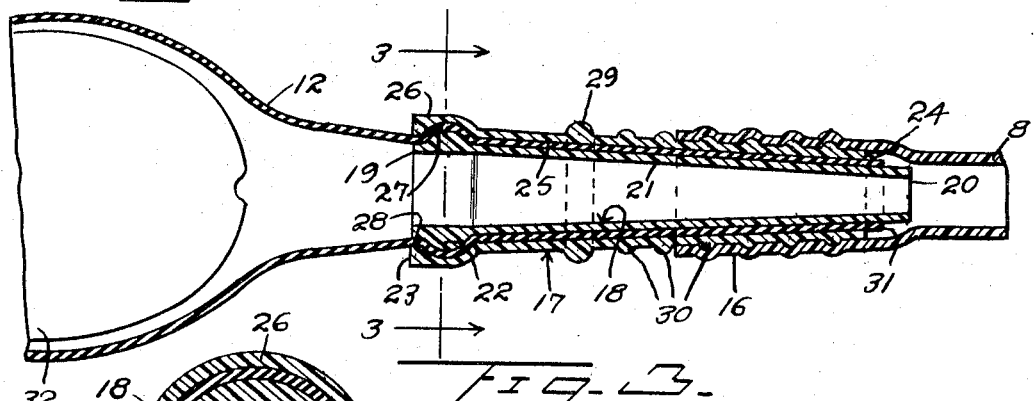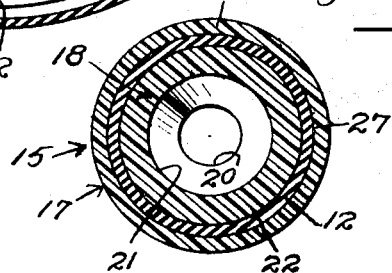

3,339,551
Patented Sept. 5, 1967

3,339,551
CONNECTION FOR AN EVACUATION
DEVICE
Guy H. Stoutenburgh, Delray Beach, Fla. (630 N. Road, Harbor Estates, Boynton Beach, Fla. 33435)
Filed Mar. 19, 1965, Ser. No. 441,148
6 Claims. (Cl. 128—295)

This invention relates to a novel connection for an evacuation device or apparatus of the type disclosed in my prior U.S. Patent No. 3,138,160, issued June 23, 1964, and has for a primary object to provide a leakproof connection which may be effectively utilized for quickly attaching a sheath to a drainage tube to form an open leakproof union between the sheath and the drainage tube, and which will greatly facilitate replacement of the sheath.

Another object of the invention is to provide a connection or assembly of extremely simple, lightweight construction which will enable the evacuation device to be utilized by male incontinents either ambulatory, sitting, in bed or elsewhere under conditions where a drainage receptacle can be readily concealed.

Various other objects and advantages of the invention, including those set forth in my aforementioned prior patent, will hereafter become more fully apparent from the following description of the drawing, illustrating a presently preferred embodiment thereof, and wherein:

FIGURE 1 is a fragmentary elevational view of the evacuation device in an applied position, including the connection;

FIGURE 2 is an enlarged fragmentary longitudinal sectional view, taken substantially along the line 2—2 of FIGURE 1;

FIGURE 3 is an enlarged cross sectional view through a part of the connection, taken substantially along a plane as indicated by the line 3—3 of FIGURE 2;

FIGURE 4 is a side elevational view of one part of the connection, and

FIGURE 5 is a similar view of the other part thereof.

Referring more specifically to the drawing, the evacuation device in its entirety is designated generally 7 and includes a flexible drainage tube 8 which may be of any desired length and which may be formed of rubber, plastic or other leakproof material. A receptacle 9, such as a jar, constitutes a part of the device 7 and has a removable closure 10 through which an end, not shown, of the tube 8 extends to discharge into the receptacle 9. The closure 10 is provided with a vent port 11.

An elongated thin sheath 12 of elastomer material constitutes the other end of the device 7 and includes an end 13, as seen in FIGURE 5, and an opposite rolled or beaded end 14, as seen in FIGURE 1.

The connection 15, forming a part of the device 7, constitutes the present invention and provides an open leakproof connection between the sheath 12 and an end 16 of the drainage tube 8. The connection 15 consists of an outer part or shell 17, as seen in FIGURE 4, and an inner part or core 18, as seen in FIGURE 5, each of which parts is formed of a molded plastic material.

The core 18 comprises an elongated tube which tapers from its inlet end 19 to its outlet end 20 and which has a bore 21 extending from end-to-end therethrough and which is also tapered in the same direction as the core. The core 18 has an annular enlargement 22 adjacent its end 19 which is convexly rounded in cross section, as seen in FIGURE 2.

The shell 17 also constitutes a tube which is tapered from its enlarged end 23 to its opposite end 24 and which has a bore 25 extending from end-to-end therethrough. The bore 25 tapers in the same direction as the shell 17. The shell 17 is externally enlarged as seen at 26 at and adjacent its end 23 and said enlargement 26 is internally recessed to provide an enlarged annular chamber 27 of the bore 25 which is of concave cross section, as seen in FIGURE 2. The bore 25 has an end portion 28 opening through the end 23 and which is of smaller diameter than the chamber 27. The shell 17 is provided with an annular external enlargement or rib 29 which is spaced from the enlargement 26 but disposed nearer said enlargement 26 than the end 24. The exterior of the shell 17 is ribbed, as seen at 30, between the enlargement 29 and the end 24. It will be noted that the core 18 is somewhat longer than the shell 17. The shell 17 is formed of a material which is somewhat resilient.

In completing the assembly of the evacuation device 7, the core 18 is inserted into the sheath 12 through its open end 14 and positioned lengthwise of the sheath and with the end 20 of the core pressing against the sheath end 13, as seen in FIGURE 5. The sheath is stretched lengthwise over the core 18 and while thus held with one hand, the end 20 of the core is inserted into the shell 17, which is held in the other hand, through the bore end 28. The sheath covered core is moved longitudinally through the shell 17 until the enlargement 22 thereof contacts the bore end 28. Pressure is then applied to the core to force the enlargement 22 through said bore end 28, causing said bore end to expand until the enlargement 22 snaps into the chamber 27 in which it is held by contraction of the enlarged shell portion 26. When the core 18 is thus seated in the shell 17, the end 20 thereof will be disposed beyond the end 24 of the shell. The sheath portion 13 which is stretched across the end is then punctured in any suitable manner to provide an opening 31 through which the core end 20 projects, due to stretching of the sheath 12. This open end 31 of the sheath is clamped securely between the core 18 and the shell end 24. Said end 20 and the shell portion 30 are then forcibly inserted into the tube end 16 to effect expansion of said tube end to grip the ribbed shell portion 30 and thus provide a leakproof union between the sheath 12 and tube 8.

It will thus be seen that the sheath 12 is connected to the tube 8 without the use of tape, elastic band or other clamping means which would have to be removed and replaced in order to remove and replace the sheath 12 with a fresh sheath. With the connection 15, this can be readily accomplished by detaching the connection 15 from the tube end 16, after which the shell may be gripped by the thumb and index finger of one hand engaging the shell between its enlargements 26 and 29. Pressure can then be exerted with the thumb of the other hand against the core end 20 for forcing the enlargement 22 of the core out of the chamber 27 and through the bore end 28 so that the sheath 12 can be removed from the core 18 and a new sheath applied and connected as heretofore described. The sheath 12 is applied to the male organ 32 in the same manner as fully described in my prior patent, heretofore referred to, and may be held in an applied position by a strip of elastic tape 33.

Various modifications and changes are contemplated and may obviously be resorted to without departing from the function or scope of the invention as hereinafter defined by the appended claims.

I claim as my invention:

1. An evacuation device comprising, in combination with an elongated sheath of elastomer material having an open end adapted to receive and encase a male organ and an opposite end provided with a restricted opening, and a flexible drainage tube having an inlet end and an outlet end; a connection for connecting the sheath to the drainage tube comprising a tubular core and tubular shell, said core being disposed in the sheath and having an outlet end extending through said restricted opening, and said sheath encased core being detachably disposed in extending through the shell for clamping a part of the sheath, disposed adjacent said restricted opening, between the shell and core, said outlet end of the core and a portion of the shell disposed adjacent thereto being detachably secured by a press fit engagement in said inlet end of the drainage tube for providing a leakproof union between the restricted opening of the sheath and said drainage tube.

2. An evacuation device as in claim 1, said core and shell being tapered toward said outlet end of the core.

3. An evacuation device as in claim 1, said core and shell having means for detachably securing the core in the shell remote from said outlet end of the core.

4. An evacuation device as in claim 3, said outlet end of the core protruding from the adjacent end of the shell when the core is secured in the shell, to facilitate forcibly ejecting the opposite end of the core from the end of the shell disposed remote from said outlet of the core, and said restricted opening of the sheath being disposed between the outlet end of the core and said adjacent end of the shell.

5. An evacuation device as in claim 1, said core having an external enlargement remote from its outlet end, said shell having an internal chamber to receive said enlargement when the core is fully inserted in the shell, and said shell being formed of an elastic material to permit expansion thereof to permit movement of the enlargement into and out of said chamber.

6. An evacuation device comprising, in combination with an elongated sheath of elastomer material having an open end adapted to receive and encase a male organ and an opposite end provided with a restricted opening, and a flexible drainage tube having an inlet end and an outlet end; a connection for connecting the sheath to the drainage tube comprising a tubular core and tubular shell, said core being disposed in the sheath and having an outlet end extending through said restricted opening, and said sheath encased core being detachably disposed in and extending through the shell for clamping a part of the sheath, disposed adjacent said restricted opening, between the shell and core, said connection being detachably secured to said inlet end of the drainage tube with the outlet end of the core disposed in the drainage tube for providing a leakproof union between the restricted opening of the sheath and said drainage tube.

References Cited
UNITED STATES PATENTS

| | | | |
|---|---|---|---|
| 2,789,560 | 4/1957 | Weimer | 128—295 |
| 3,039,464 | 6/1962 | Galindo | 128—283 |
| 3,043,306 | 7/1962 | Hereatt et al. | 128—283 |
| 3,138,160 | 6/1964 | Stoutenburgh | 128—295 |
| 3,161,197 | 12/1964 | Glas et al. | 128—295 |
| 3,298,370 | 1/1967 | Beatty | 128—295 |

RICHARD A. GAUDET, *Primary Examiner.*

CHARLES F. ROSENBAUM, *Examiner.*